June 4, 1957 R. L. HASCHE Re. 24,326

SEMI-MAKE AND HEAT REGENERATIVE PROCESS AND APPARATUS

Original Filed Aug. 17, 1951

Rudolph L. Hasche
INVENTOR.

BY Daniel J. Mayne
Harold N. Powell

ATTORNEYS

United States Patent Office

Re. 24,326
Reissued June 4, 1957

24,326

SEMI-MAKE AND HEAT REGENERATIVE PROCESS AND APPARATUS

Rudolph Leonard Hasche, Johnson City, Tenn., assignor, by mesne assignments, to Koppers Company, Inc., Pittsburgh, Pa., a corporation of Delaware

Original No. 2,755,321, dated July 17, 1956, Serial No. 242,262, August 17, 1951. Application for reissue October 24, 1956, Serial No. 618,163

13 Claims. (Cl. 260—679)

Figure 1:
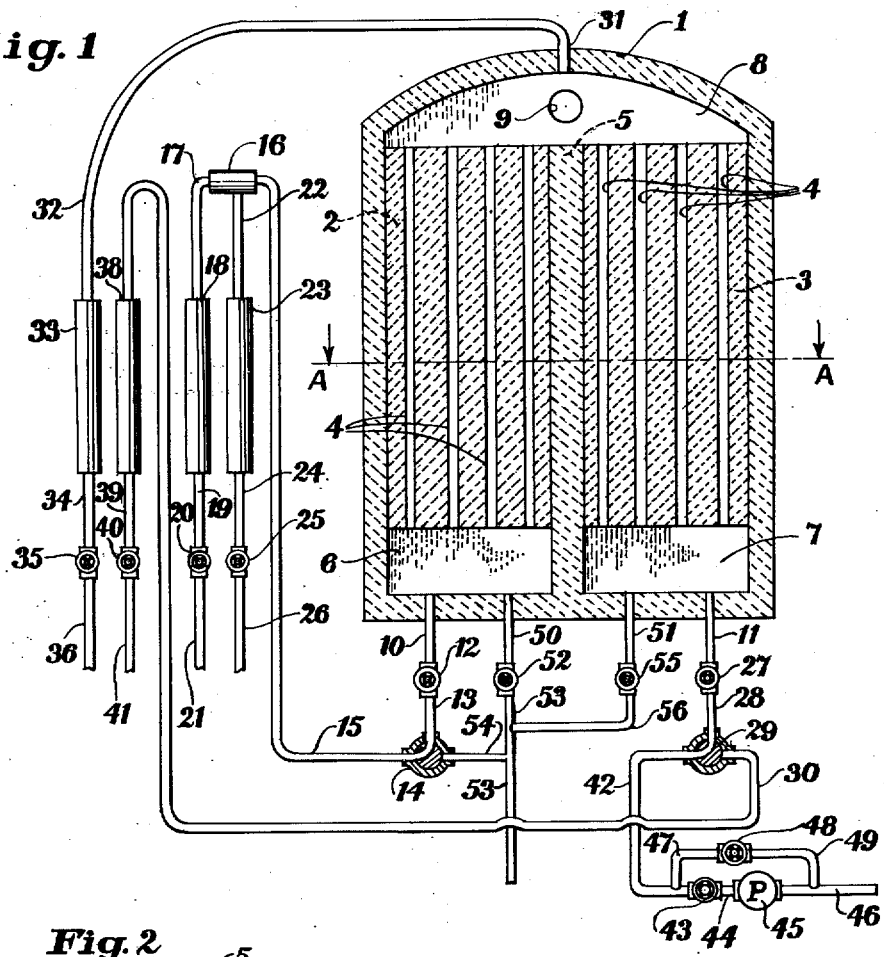

Matter enclosed in heavy brackets [ ] appears in the original patent but forms no part of this reissue specification; matter printed in italics indicates the additions made by reissue.

This invention embraces a novel regenerative process and apparatus whereby a combination of endothermic and exothermic gas reactions may be effected at high thermal efficiencies.

More particularly, the invention relates to an intermittent type regenerative process entailing alternate production and heating steps. The heat required for the endothermic reactions is stored in the refractory regenerative furnace by the preceding heating step. The process is appropriately designated a "semi-make and heat" process.

This application is a continuation-in-part of my companion copending application, Serial No. 175,941 filed July 26, 1950, and is particularly directed to processes and apparatus for acetylene manufacture. In my companion case, Serial No. 175,941, I have disclosed several processes, and I am now directing said case to generic claims and claims to the species and process having to do with reforming (i. e., the manufacture of fuel gases). In the instant application, as just mentioned, I am directing the application to processes other than reforming and in particular improved processes for acetylene manufacture. The instant case is to some extent also a continuation-in-part of my earlier filed companion copending applications, Serial No. 154,185 filed April 5, 1950, and Serial No. 208,174 filed January 27, 1951, *now abandoned*, in that, for example, apparatus such as disclosed in my application, Serial No. 208,174 may be used in carrying out the species of process for acetylene manufacture described herein. That is, the horizontal type furnace of the case just mentioned may be used, or the vertical furnace as shown in the drawing attached hereto and made a part hereof, may be employed in carrying out the process of the present invention.

One object of the invention is to provide an improved semi-make and heat process for the conversion of hydrocarbons, including natural gas and certain other chemicals to certain products.

A further and primary object of the invention is to provide a highly efficient and economical process for the production of various other endothermic gas reaction products including acetylene, hydrazine, and aromatic compounds such as benzene. It is an object of my invention to provide a process in which the major portion of the contributed sensible heat to the in gas is derived from removed sensible heat taken from the off gas and stored in a regenerative mass. In my process the contributed sensible heat may be about equal to the reaction heat carried away so that a substantial heat economy is effected by the recovery and reuse of sensible heat.

*My aforementioned* [In Hasche] application, Serial No. 154,185, [filed April 5, 1950, of which this application is a continuation-in-part as aforementioned, there is described] *discloses* a refractory regenerative apparatus and process in which a similar combination of endothermic and exothermic gas reactions are effected continuously to provide an uninterrupted flow of product gas. *The invention of the present application differs from that of Serial No. 154,185 in that*

[In general, the refractory regenerative process of] This invention comprises a [cycle] *cyclic process* embracing (a) a production or make step, and (b) a heating step, these steps being [reversed] *alternated* at appropriate intervals.

In accordance with the general aspects of this invention, the production or "make" step (a) comprises passing a hydrocarbon or mixture of hydrocarbons with or without a diluent through the channels of a first regenerative mass from the cooler to the hotter end thereof, said first regenerative mass having previously been heated to a temperature such that thermal alteration of the starting material is effected in the course of such passage, thereby carrying out endothermic reactions and producing heating gases and endothermic products such as acetylene and olefins, and thereby producing a second gaseous mixture comprising the desired product and thereafter quenching said second gaseous mixture by passing the same through a second regenerative mass which has previously been heated similarly to said first regenerative mass from the hotter to the cooler end thereof.

The heating step (b) of the process comprises passing air (or oxygen containing gas) through the channels of the second refractory regenerative mass from the cooler to the hotter end thereof thereby heating said oxygen-containing gas to ignition temperature, passing said heated oxygen-containing gas into the combustion and thermal alteration zone where it mixes with fuel gas, wherein the combustion reaction is substantially completed and thereafter passing the hot combustion gases so produced through the channels of said first regenerative mass from the hotter to the cooler ends thereof. It appears well to emphasize at this point that the gas mixture to be cracked is "nonflammable" whereas the fuel gas-air mixture used to obtain the heating is "flammable."

The production step (a) and the heating step (b) are alternated at appropriate intervals. Generally speaking, a period of about 1 to about 4 minutes is adequate for the heating step. Preferably this step is carried out for about 1 to about 2 minutes. The production step may be carried out until the temperature of the refractory mass falls below that requisite for efficient operation as will be discussed in further detail hereinafter. Generally, the production step can be carried out for a period of about one minute, preferably from about 30 seconds to about 100 seconds.

Considering in more detail the production step (a) of the process, in those cases where a hydrocarbon is employed a diluent may or may not be used. When operating at high temperatures to produce acetylene from a hydrocarbon higher than methane it may be an advantage to use steam diluent. When operating at lower temperatures to produce olefins and benzene or the like no diluent is required. Also, when operating on methane no diluent is usually necessary except in the highest temperature ranges where a certain amount of steam diluent may be used.

In the heating step, substantially any exothermically combustible fuel gas may be employed. It is desirable, however, as mentioned above, that the fuel gas be mixed in the combustion zone with an oxygen containing gas (as air) in flammable proportions.

It will be appreciated that in order to obtain high heat efficiency and economy the regenerative masses through which the gaseous starting materials are passed are so heated that there is a temperature gradient present therein. To this end it is preferred that the hotter end of the regenerative mass be at a temperature in excess of about 900° C., preferably 1000° C. to 1300° C. The colder end of the regenerative mass is normally at a temperature of about 100° C. to 150° C. as a result of the operation of the furnace.

It will also be understood that the refractory regenerative masses should be preheated prior to the initiation of the process, to establish the aforementioned temperature gradient therein so that the step of the cycle first carried out may be completed. This preheating may be effected in any desired manner. Normally the refractory regenerative furnaces employed are provided with a heating means for this purpose. A desirable mode of operation entails heating the second regenerative mass in a manner such that the combustible fuel employed in the heating step will be ignited upon contact with heated air, heated to ignition temperature, in the final stages of passage from the cooler to the hotter end thereof and initiating the heating step in the combustion zone. To accomplish this result, the refractory regenerative mass should be preheated in such a manner that the cooler end is at a temperature of about 100° C., preferably from 75° C. to 150° C. and the hotter end is about 1100° C., preferably from 1000° C. to 1300° C.

The regenerative process of this invention is admirably suited to operation under sub-atmospheric or super-atmospheric conditions. Accordingly, the process of the invention is appropriate for the production not only of unsaturated hydrocarbons from more saturated starting materials, but also may be employed to advantage in effecting other reactions involving the formation of endothermic reaction products. Thus, sub-atmospheric pressure may appropriately be employed for the production of acetylene, and also in some instances hydrazine from ammonia, and of certain other products which require extremely rapid quenching to prevent destruction thereof. Such reactions are preferably carried out at a pressure of from about 0.2 atmosphere absolute to about 0.8 atmosphere absolute. It will be apparent from the description hereinafter that both the residence period and the quenching time of the gases in the furnace can be reduced in approximate direct proportion to the reduction in pressure below atmospheric of the gases undergoing treatment.

Similarly, operation at super-atmospheric pressure is desirably employed for the production of higher olefins and liquid fuels from higher molecular weight starting materials. A preferred range of super-atmospheric pressure operations is from about 2 to about 5 atmospheres. Through the utilization of such super-atmospheric pressure the longer reaction and quenching periods which are of significance in the production of these materials may be achieved.

The hydrocarbon employed may be any hydrocarbon which is gaseous or may be vaporized under the conditions and which is subject to thermal cracking. Thus, low molecular weight compounds such as methane, ethane, propane and the various isomeric butanes, hexanes, and mixtures thereof may be employed as well as higher molecular weight materials such as the octanes and decanes and petroleum naphtha. Unsaturated materials may be employed. Low molecular weight, saturated, normally gaseous hydrocarbons such as propane and butane are preferred. However, liquid hydrocarbons may be vaporized to produce good yields of the higher liquid olefins. In some instances it is desirable to utilize some steam diluent in conjunction with the starting material.

It is further essential that low pressure drop, a high rate of heat transfer and short contact time with the regenerative furnace of the gases undergoing treatment in the production step be adhered to in the process.

It is accordingly critical that the period of residence of the gases undergoing treatment in that portion of the regenerative mass wherein the gases are heated to the cracking temperature of the starting material not exceed about 0.3X second, where X represents the pressure in absolute atmospheres at which the process is carried out.

A preferable range for this residence period is from about 0.05X second to about 0.1X second. It is likewise necessary that the period of residence of the gases undergoing treatment in that portion of the regenerative furnace preheating step and cracking reaction occurs not exceed about 0.05X second. A preferable range for this period of residence is from about 0.01X second to about 0.03X second. It will be observed, as previously indicated, that the above defined preferred and critical residence periods vary directly with variations from atmospheric pressure in the conduct of the process. As the product gases are quenched by passage through a second regenerative mass, the same limits of residence time obtain as those previously defined with respect to the initial heating step.

Operations conducted at atmospheric pressure are usually suitable for the production of lower olefinic hydrocarbons and the like. When it is desired to produce acetylene, nitric oxide, hydrazine, and the like, which products require very short residence time in the regenerative masses and extremely rapid quenching, the process of the invention is effected in accordance with one embodiment of the present invention, at sub-atmospheric pressure, preferably from 0.2 to 0.8 atmosphere absolute. The foregoing limits of residence time will in such cases be reduced to an extent corresponding to the reduction in pressure of operation. For example, if the process is effected at a pressure of about one-third atmosphere absolute, the residence time and quenching time in the regenerative masses are reduced to not in excess of 0.10 second and the residence time in the combustion zone to not in excess of about 0.017 second.

Similarly, when operating in the preferred sub-atmospheric pressure range of 0.2 to 0.8 atmosphere absolute, for the extremes of the range the corresponding critical residence times in the two regenerative masses are $0.2\times.3$ or 0.06 second and $0.8\times.3$ or 0.24 second respectively. Analogous limits with respect to residence time in the simultaneous cracking and combustion zone of the furnace are $0.2\times0.05$ or 0.01 second and $0.8\times0.05$ or 0.04 second. Preferred ranges for residence period of the gases undergoing treatment at any particular pressure may similarly be calculated on the basis of the preferred ranges for operations at atmospheric pressure. Operation may likewise be carried out at atmospheric pressure when producing acetylene by an equivalent reduction on the partial pressure of the hydrocarbon undergoing pyrolysis by employing steam dilution.

Likewise when operating at super-atmospheric pressure for the production of higher liquid olefins and the like, proportionately longer residence periods which favor the reactions yielding such products are employed. Thus, at a pressure of two atmospheres, residence times as great as 0.6 second may be employed.

It will be apparent that the reduction of residence and quenching periods by the reduction in pressure in the system can be accomplished without a corresponding increase in pressure drop through the regenerative mass because only the lineal gas velocity is increased, not the mass velocity. This feature of restricted pressure drop constitutes one of the salient advantages of this invention.

It is also highly desirable that the pressure drop in the apparatus not exceed about 5 pounds per square inch. A preferable range is from about 1 pound per square inch to about 2.5 pounds per square inch.

One type of regenerative furnace structure in which this process may be carried out is that described in companion application Serial No. 154,185, mentioned above. Briefly stated, this furnace comprises two regenerative masses having a plurality of uninterrupted flues or slots passing therethrough. Each of said regenerative masses is provided with a free space at one extremity of the flues for the introduction or withdrawal of gases. The opposite extremities of the regenerative masses are interconnected with an insulated combustion chamber which is provided with a heating means. Each of the aforementioned free spaces is provided with gas admission and withdrawal means which are in turn associated with means for causing a gas to flow from the aforementioned free space of one regenerative mass through the flues or slots thereof into and through the combustion chamber and thence through the flues of the second regenerative mass. Means for the reversing of this gas flow are also provided.

Figure 2:
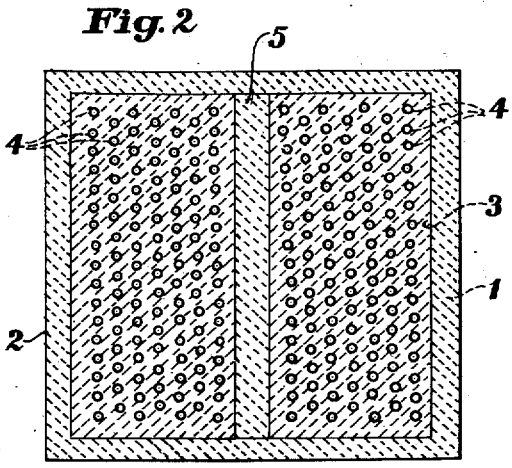

This novel furnace structure will now be described in detail with reference to the accompanying drawings in which, Figure 1 represents, partly in vertical section, partly diagrammatically, a complete apparatus in accordance with the present invention, and Figure 2 represents a horizontal section taken on the line A—A of Figure 1.

In Figure 1 there is shown a refractory insulated chamber 1 containing two contiguous regenerative checkerworks 2 and 3, both of which are provided with straight, uninterrupted flues 4. Checkerworks 2 and 3 are separated by gas-tight wall 5 and respectively provided with gas inlet and withdrawal spaces 6 and 7, which are in communication with flues 4. Above the regenerative checkerworks 2 and 3, there is provided an interconnecting chamber 8 which is in communication with the upper extremities of flues 4 of both regenerative checkerworks 2 and 3. Chamber 8 is provided with port 9. A burner for gaseous or liquid fuel is inserted in this port for preheating. Also, fuel gas may be injected through this port and/or through port 31 as will be described. That is, chamber 8 may be connected by conduit 32, through flow meter 33, line 34, valve 35 and line 36 to a source of fuel gas for use in the heating step. Gas inlet and withdrawal lines 10 and 11, connect respectively with gas inlet and withdrawal spaces 6 and 7. Line 10 is connected through valve 12, line 13, three-way valve 14, and inlet line 15 to mixer 16. Mixer 16 is connected through line 17, flow meter 18, line 19, valve 20, and line 21 to a source of starting material (hydrocarbon) not shown. Mixer 16 is also connected through line 22, flow meter 23, line 24, valve 25, and line 26, to a source of steam or other diluent not shown.

Line 11 is connected through valve 27, line 28, three-way valve 29, and outlet line 30 to flow meter 38, line 39, valve 40, and line 41 to a source of oxygen-containing gas, such as air, not shown.

Line 11 is also connected through valve 27, line 28, and three-way valve 29 to line 42 which functions as a discharge line during the heating or make step of the process. Line 42 is connected through valve 43, line 44, pump 45, and line 46 to a gas purification system, not shown. Line 42 is also connected to by-pass line 47 which is connected through by-pass valve 48 and line 49 to line 46. Product gas may be led through the by-pass system when the process is operated at substantially atmospheric or super-atmospheric pressure.

Gas inlet and withdrawal spaces 6 and 7 are also provided with exhaust lines 50 and 51 respectively. Exhaust line 50 leads through valve 52 and line 53 to a stack, not shown. Line 53 is also connected to line 54 which is in turn operatively connected to three-way valve 14. Exhaust line 51 is connected through valve 55 and line 56 to line 53.

Very high heat transfer, short residence period, and low pressure drop in the regenerative furnace are features permitting the successful practice of the previously mentioned process for the production of acetylene, other unsaturated hydrocarbons and other endothermic reaction products. To this end it is necessary that the above described furnace structure and modifications thereof embraced by this invention conform to certain definite structural limitations. It is critical and essential that the length of the regenerative checkerworks 2 and 3 not exceed about fifteen feet in length. Likewise, regenerative checkerworks of less than about four feet in length are impractical although the lower limit is not as critical. A preferred length for the regenerative checkerworks is from about 6 feet to about 10 feet.

It is also essential for preferred operation that the gas passageways or flues 4 in the regenerative checkerwork not exceed about 0.75 inch in maximum width or diameter. The lower limit of operable width or diameter of such flues is not necessarily critical but must not be so small that excess pressure drop in the furnace occurs as a consequence thereof. Generally, flues of maximum width or diameter of from about 0.75 inch to about 0.25 inch may feasibly be employed. Flues of maximum width or diameter of from about 0.5 inch to about 0.375 inch are preferred. It will be apparent that mere masses of promiscuously deposited heat absorbing solids are unsatisfactory regenerative masses for the furnace of this invention.

It is also essential for preferred operation that the ratio of the total volume of the flues 4 in each regenerative checkerwork 2 or 3 to the total volume of the checkerwork in which the flues are located not exceed about 1:3. A preferred range for this ratio is from about 1:4 to about 1:10 and a practical lower limit is about 1:20. This lower limit, however, is not critical except insofar as pressure drop is concerned.

A particularly appropriate type of checker brick for use in the construction of the regenerative checkerwork of the furnace of this invention is that described and claimed in my companion copending application Serial No. 129,969, entitled "Regenerative Packing Construction," filed November 29, 1949 *and now abandoned in favor of my U. S. Patents No. 2,622,864 and No. 2,692,-131 which are continuations-in-part of Serial No. 129,-969.* These checker bricks are prepared from any conventional refractory material such as the various calcium, magnesium, aluminum, silicon, iron, chromium, etc., oxides and mixtures thereof. Furthermore, as a consequence of the thermodynamic advantages of the process of this invention in the lower or cooler portions of the regenerative masses, a checkerwork metal such as iron or copper or a checkerwork graphite may be employed. Preferably, the bricks are prepared from a material having a high alumina content to obtain maximum heat capacity, high refractoriness, high thermal stability and inertness toward the gases undergoing treatment.

The novel placement of the flues or gas passages 4 in this checker brick is diagrammatically shown in Figure 2. It will be observed that all of the flues are approximately equidistantly spaced from all the next closest adjoining flues and that accordingly the thickness of the walls between each flue and the next adjoining flue is uniform. As shown in the drawing, for example, each flue is circular in shape and has a diameter of about ⅜ inch. Furthermore, it is approximately ¾ inch from the center of each flue to the center of the next most closely adjoining flues. Obvious variations in relative size and shape of the flues and interwall thickness are operable within the previously defined limits with respect to maximum slot size and volume. Conventional checker bricks of other types than those described in aforementioned application Serial No. 129,969 may of course be employed if the aforementioned limits are observed.

It is further required that the volume of the combustion chamber 8 not exceed about 60% of the combined volume of the flues 4 in both the regenerative checkerworks 2 and 3. It is preferred that the volume of the combustion chamber 8 be equal to from about 20% to about 40% of the aforementioned combined volume of the flues 4.

While the furnace disclosed in the attached drawing is vertically disposed, the processes of the present invention may be carried out in a horizontally disposed furnace such as the novel furnace shown in my copending application, Serial No. 208,174, referred to above.

General operation of the furnace and the process of the invention to convert a hydrocarbon, such as to obtain olefin yields from propane, will be described by reference to Figure 1.

*Initial heating*

Prior to initiation of the cracking reaction the furnace must be preheated. To this end valves 52 and 55 are opened and valves 12 and 27 are closed. Heating means is then actuated by burner 9 in chamber 8 whereby hot combustion gases are caused to pass downwardly in parallel streams through flues 4 of refractory checkers 2 and 3, into gas inlet and withdrawal spaces 6 and 7. From gas inlet and withdrawal spaces 6 and 7 the combustion products pass out of the furnace through lines 50 and 51, valves 52 and 55, and lines 53 and 56. During passage through flues 4, the hot combustion gases produced by heating means 9 give up heat to regenerative checkers 2 and 3. The heat transfer efficiency resulting from the construction and dimensions of the regenerative checkerworks 2 and 3, previously described, is such that the combustion gases leave the furnace at a room temperature of about 100° C. This preheating procedure is continued until the top of both regenerative checkerworks 2 and 3 is in excess of 1000° C. and preferably within the range of about 1100° C., to about 1300° C. There is thus provided a temperature gradient in regenerative checkerworks 2 and 3 ranging from about 100° C. at the colder ends thereof to a temperature in excess of about 1000° C. at the hotter end thereof.

At the close of the preheating period just described, valves 52 and 55 are closed and valves 12 and 27 are opened.

*Production step*

The production step is then initiated by introducing oxygen and/or steam through line 26, valve 25, line 24, flow meter 23 and line 22 into mixer 16. The amount of oxygen (air) which may be incorporated will be discussed in detail hereinafter. Simultaneously, hydrocarbon starting material, in this instance propane, is introduced through line 21, valve 20, line 19, flow meter 18, and line 17 into mixer 16 where it is combined with steam in such quantity that the resulting mixture contains about 20 volumes of propane, about 80 volumes of steam. The mixture of propane and steam passes out of mixer 16 through line 15, three-way valve 14, line 13, valve 12 and line 10 into gas inlet space 6 of the furnace. The mixture then passes up through the flues 4 of the checkerwork 2. In the course of such passage the temperature of the propane and steam is raised until near the top of the checkerwork 2 thermal alteration occurs consisting of a combination of cracking and reforming reactions. The mechanism of the reaction is probably cracking to carbon and hydrogen and subsequent reaction of the carbon with steam to form predominantly carbon monoxide and hydrogen.

From the flues 4 of the checker work 2 the gaseous mixture passes into the chamber 8 where the thermal alteration reaction is substantially completed. The gaseous mixture so produced passes downwardly through flues 4 of checkerwork 3 and is thereby quenched. The gaseous product gives up heat to the checkerwork 3 during the course of such passage. From the flues 4 of the checkerwork 3 the product mixture passes into gas inlet and withdrawal chamber 7 and thence out of the furnace through line 11, valve 27, line 28, three-way valve 29, line 42, valve 43, line 44, pump 45, and line 46 to a gas purification system, not shown. Alternatively, the gas may be passed from valve 29 through line 42, by-pass line 47, by-pass valve 48, and line 49 to line 46 and thence to the gas purification system. Details relative to the separation of olefins or acetylene, etc., are not set forth herein and may be accomplished in any suitable manner. Any hydrocarbon gas, besides the desired product, or other combustibles separated may be used for fuel. For example, acetylene can be separated by the method of my companion copending application, Serial No. 146,400, now U. S. Patent No. 2,667,234. Hence, separation details are not set forth herein.

This production step is continued in the manner specified for approximately one minute, and thereafter valves 14 and 29 are simultaneously reversed as rapidly as possible *for the heating step*. Preferably, this reversal is accomplished in a fraction of a second.

*Heating step*

When the reversal of valves 14 and 29 has been effected, the heating period is initiated. To this end fuel gas is introduced through line 36, valve 35, line 34, flow meter 33, and line 32 into chamber 8 through port 31. Simultaneously, air is introduced through line 41, valve 40, line 39, flow meter 38, and line 30, three-way valve 29, line 28, valve 27, and line 11 into gas inlet and withdrawal space 7. From gas inlet and withdrawal space 7 the oxygen-containing gas (air, for example) passes upwardly through the flues 4 of regenerative mass 3 wherein it is heated to or above the fuel gas ignition temperature. The heated oxygen-containing gas then passes into combustion chamber 8 wherein it mixes with fuel gas and combustion takes place. The gaseous combustion products are then passed downwardly through the flues 4 of the regenerative mass 2 into gas inlet and withdrawal chamber 6 and thence out of the furnace through line 10, valve 12, line 13, valve 14, and lines 54 and 53 to a stack not shown. During the passage through the flues 4 of regenerative mass 2, the combustion products give up heat and raise the mass to a temperature adequate to effect thermal cracking of the propane or other material to be converted during the next ensuing production step. This heating step is carried out for approximately one minute or until such a time that the temperature of the top tile in regenerative mass 2 is 1100° C. or above.

The period of residence in the production step of the gases undergoing treatment in each of the regenerative masses was about 0.1 second and in the combustion and thermal alteration chamber about 0.02 second. In the operation of the process on propane it is possible to produce high yields of unsaturated hydrocarbons exemplified by ethylene and/or acetylene.

The general process of the invention may be used to great advantage in the production of acetylene from natural gas. The following example illustrates this process.

EXAMPLE I

Natural gas consisting predominantly of methane was fed into the furnace in the ratio of 33 volumes of natural gas to 67 volumes of steam in the general manner described above. The heating and production steps were carried out in the same manner as that described above except that a vacuum of approximately ½ atmosphere was established in the furnace during the production step by means of pump 45. The period of residence of the gases undergoing treatment in each of the regenerative masses was about 0.05 second and in the combustion and thermal alteration chamber about 0.01 second.

The product gas obtained was of the following composition in percent by volume.

| | |
|---|---|
| Carbon dioxide | 1.1 |
| Acetylene | 7.8 |
| Ethylene | 0.9 |
| Carbon monoxide | 8.1 |
| Hydrogen | 63.6 |
| Methane | 17.3 |
| Nitrogen | 1.2 |
| | 100.0 |

It is to be observed that the operation is carried out without appreciable contamination with carbon particles. Difficulties which attend the separation of carbon from the acetylene product are thereby obviated.

It will be appreciated that the method of this invention and the apparatus described are equally suitable for operation at super-atmospheric pressure when it is desired to produce higher olefins or aromatic compounds. To achieve such a superatmospheric pressure operation, pump 45 is by-passed and the said gas is supplied to the furnace under pressure.

EXAMPLE II

A lower temperature operation was carried out employing propane at atmospheric pressure, in which case no steam diluent was used. The operation was carried out in an analogous manner except during the production step only propane was fed through pipe 15 into the regenerative mass 2 through three-way valve 14, line 13, valve 12, and line 10. During the heating period the temperature at the top of mass 2 was raised to about 1100° C.

The gas obtained from propane in accordance with this process had a heating value of 1230 B. t. u. The density of the product gas compared to air was 0.735 and it was suitable for use as a source of ethylene. Still higher yields of ethylene may be obtained by varying process conditions as described above.

The composition of the gas obtained in percent by volume is as follows:

| | |
|---|---|
| Carbon dioxide | 0.7 |
| Acetylene | 1.4 |
| Ethylene | 23.8 |
| Propylene | 6.0 |
| Benzene | 1.0 |
| Hydrogen | 24.2 |
| Methane | 32.4 |
| Propane | 10.5 |
| | 100.0 |

The preferred embodiment of the present invention is predicated upon the discovery of a method whereby oxygen, either as oxygen, per se, or as air, for example, in admixture in quantities less than those required for complete combustion with materials subject to exothermic thermal alteration may be completely utilized in an extremely short time. As a result of this discovery, it is possible to employ in the process of the present invention a much smaller relative portion of oxygen than that utilized in the continuous process which is described in my companion copending application, Serial No. 154,185. In other words, in the process of the present invention as compared with my other invention just mentioned, there is used, for example, an amount of oxygen sufficient to consume only about 10–40% of the hydrocarbon feed in the make cycle. It is apparent that this is considerably less than, or as may be stated, is insufficient oxygen to consume the hydrocarbon feed.

Therefore, in accordance with the preferred embodiment of the present invention, the production or make step (a) comprises passing a nonflammable first mixture of an exothermically combustible starting [mixture] *material* with oxygen or a free oxygen-containing gas through the unobstructed channels of the first regenerative zone from the cooler to the hotter end thereof, said first regenerative zone having previously been heated to a temperature such that thermal alteration of the hydrocarbon-insufficient oxygen materials is initiated in the course of such passage, thereby effecting incipient thermal alteration of the starting materials and producing a flammable second mixture. This flammable second mixture passes into the combustion and thermal alteration zone wherein the previously initiated thermal alteration reaction is propagated by simultaneous combustion reaction, thereby producing a third gaseous mixture comprising the desired product, exemplified by an unsaturated hydrocarbon such as acetylene. This third gaseous mixture containing the unsaturated hydrocarbon then passes through the second regenerative zone from the hotter to the cooler end thereof giving up heat thereto and becoming cooled, as already described in detail above.

The heating step (b) of the process comprises passing oxygen or oxygen-containing gas such as air through the apparatus in a manner whereby the oxygen-containing gas reaches ignition temperature or above and combustion takes place with fuel gas in chamber 8 liberating heat. The combustion products thus produced are passed through the first regenerative zone from the hotter to the cooler end thereof, thereby bringing the first regenerative zone up to the desired temperature, in excess of 900° C.

I found it particularly advantageous to supply the oxygen in the manner aforesaid and to supply the fuel at a later point in the system as, for example, through port 31 and/or the burner opening 9. In this manner the air becomes relatively highly heated and in contacting the fuel in the zone 8 combustion is localized in such a manner that it is possible to control the hot zone to a narrow range. In other words, by such procedure as just described, it is possible to maintain the high temperature zone of between 900–1300° C., for example, in the end of the first regenerative zone, for example, immediately adjacent the combustion chamber 8. Therefore, in instances where the present invention is being employed to manufacture acetylene from certain types of hydrocarbon, it may be desirable to operate in this manner so that the high temperature zone is more narrowly limited as just described. On the other hand, in producing unsaturated compounds such as olefins, there may be less need of maintaining such a narrow temperature band in the zones.

It is, therefore, apparent from the description just set forth that it is possible to control the temperature of my regenerative zones so that the temperature may be produced in the zones to the desired temperature gradient by controlling the point at which the hot oxygen-containing gas and fuel are permitted to intermix and produce combustion. It is further apparent in that inlet ports (not shown) for either the oxygen or the fuel may be included in the zones at other points than those shown for permitting the carrying out of the above process to the desired extent of producing the hot zone at a particular point.

Certain limitations preferably should be observed with respect to this process. It is desirable that the original mixture in the production step contain hydrocarbon or other starting material and oxygen in nonflammable proportions to preclude excessive consumption of the starting material by combustion. Furthermore, only so much oxygen is employed in the production step as is required to obtain the heat requisite to the production of the desired pyrolysis product. Air, oxygen or oxygen in admixture with gases inert under the conditions may be employed. Air is preferred.

Speaking generally air may be mixed with low molecular weight hydrocarbons in the range of proportions in parts by volume from 0.5 part of air per part of hydrocarbon to 2.5 parts of air per part of hydrocarbon. Similar ratios for oxygen are from 0.1 part of oxygen per part of hydrocarbon to 0.5 part of oxygen per part of hydrocarbon.

The preferred range of proportions of oxygen or air for use in conjunction with the preferred starting materials in the production step of the process for operation at atmospheric pressure are set forth in Table 1.

Table I

| Hydrocarbon | Preferred Range (Volumes per volume of hydrocarbon) | |
|---|---|---|
| | Oxygen | Air |
| Methane | 0.1–0.4 | 0.5–2.0 |
| Ethane | 0.1–0.4 | 0.5–2.0 |
| Propane | 0.1–0.5 | 0.5–2.5 |
| Butane | 0.15–0.8 | 0.75–4.0 |
| Ethylene | 0.075–0.3 | 0.3–1.5 |
| Propylene | 0.1–0.4 | 0.5–2.0 |
| Butylene | 0.1–0.5 | 0.5–2.5 |
| Natural Gas | 0.1–0.4 | 0.5–2.0 |

It is also desirable to the success of the process that both the hydrocarbon or other starting material and the oxygen be preheated to the incipient cracking or thermal alteration temperature as described. The addition of unpreheated oxygen or oxygen containing gas to the starting material raised to the thermal alteration temperature is not as satisfactory as preheating the components as described above.

A still further understanding of the preferred embodiment of my invention will be had from a consideration of the following example.

EXAMPLE III

Natural gas consisting predominantly of methane was fed into the furnace in conjunction with air in the ratio of 45 volumes of natural gas to 55 volumes of air in the manner previously described for the production of products from propane. The heating and production steps were carried out in the same general manner as that described above, except that a vacuum of approximately ½ atmosphere was established in the furnace during the production step by means of pump 45. The period of residence of the gases undergoing treatment in each of the regenerative masses was about 0.05 second and in the combustion and thermal alteration chamber about 0.01 second.

The product gas obtained was of the following composition in percent by volume:

| | |
|---|---|
| Carbon dioxide | 1.1 |
| Acetylene | 8.6 |
| Ethylene | 0.7 |
| Carbon monoxide | 5.4 |
| Hydrogen | 46.8 |
| Methane | 4.4 |
| Nitrogen | 33.0 |
| | 100.0 |

It will be observed that the yield of acetylene obtained is about 48% of theoretical and that a high degree of pyrolysis has been obtained without appreciable contamination of carbon particles. Difficulties which attend the separation of the carbon from the acetylene product are thereby obviated.

By virtue of this invention it is possible as just shown to produce acetylene and other highly unsaturated endothermic gas reaction products substantially free of contamination with carbon or other such materials. While the description immediately preceding has been with respect to the processing of propane, methane and the like, this is merely for the purposes of illustration and is not a limitation on the present invention. As already discussed in detail earlier in this application, and as also apparent from my issued patents, various raw materials may be converted by the present process and apparatus. Similar comments apply to such items as diluents, oygxen containing gas and the like. As is apparent, air is generally the most convenient gas used as a source of oxygen. However, oxygen, per se (from a liquid air plant, for example) may be used where available, giving some increased capacity effect and other advantages. Therefore, it is apparent the present invention should not be unduly limited.

I claim:

1. A cyclic process for the production of unsaturated hydrocarbons from suitable hydrocarbon starting material which comprises passing a non-flammable first mixture of a [hydrocarbon] *said* starting material and a free-oxygen-containing gas through a plurality of straight flues, uninterrupted throughout their length, of a first regenerative zone from the cooler to the hotter end thereof, said first regenerative zone having previously been so heated that the temperature of the hotter end is sufficiently high to initiate thermal alteration of said starting material, thereby effecting incipient endothermal alteration of said starting material to produce a [second] flammable *second* mixture, passing said second [flammable] mixture into an exothermic combustion and endothermic alteration zone wherein part of said second mixture is subjected to exothermic combustion and substantially the remainder of the [hydrocarbon] starting material is subjected to endothermic alteration, passing the exothermic combustion and endothermic alteration products through a plurality of straight flues, uninterrupted throughout their length, of a second regenerative zone from the hotter to the cooler end thereof, interrupting the flow of said [non-flammable] first mixture when the temperature of the hotter end of said first regenerative zone falls below the endothermal alteration temperature of said [hydrocarbon] starting material and reheating said first regenerative zone by introducing a fuel and a free-oxygen-containing gas into said exothermic combustion and endothermic alteration zone in amounts for complete combustion of said fuel, subjecting said fuel to complete combustion, passing the resulting combustion products through the flues of said first regenerative zone from the hotter to the cooler end thereof, thereby heating the hotter end of said first regenerative zone to at least the endothermic alteration temperature of said [hydrocarbon] starting material, thereafter discontinuing the flow of fuel and free-oxygen-containing gas and reinstituting the flow of said non-flammable mixture.

2. The process of claim 1 in which the first regenerative zone is reheated by introducing the fuel directly into the exothermic combustion and endothermic alteration zone and the free-oxygen-containing gas is passed through the flues of said second regenerative zone from the cooler to the hotter end thereof into said exothermic combustion and endothermic alteration zone.

3. The process of claim 1 in which the starting mixture contains 0.1–0.8 part of free oxygen per part of hydrocarbon.

4. The process of claim 3 in which the starting mixture contains 0.1–0.4 part of free oxygen per part of hydrocarbon and the hydrocarbon consists substantially of methane.

5. The process of claim 3 in which the starting mixture contains 0.1–0.4 part of free oxygen per part of hydrocarbon and the hydrocarbon consists substantially of ethane.

6. The process of claim 3 in which the hydrocarbon contains from 2 to 4 carbon atoms.

7. The process of claim 3 in which the products of exothermic combustion and endothermic alteration are produced at substantially atmospheric pressure.

8. The process of claim 3 in which the products of exothermic combustion and endothermic alteration are produced at subatmospheric pressure.

9. The process of claim 8 in which the products of exothermic combustion and endothermic alteration are produced at a pressure of 0.2 to 0.8 atmosphere absolute.

10. The process for producing an off-gas containing a substantial amount of [acetylene] *unsaturated hydrocarbon* from an in-gas containing a substantial amount of a suitable hydrocarbon convertible to [acetylene] *said unsaturated hydrocarbon* which comprises firing adjacent ends of two separate elongated unobstructed regenerative zones so that the end adjacent the combustion zone of at least the first of said regenerative zones is heated to a temperature between 900–1300° C., thereafter feeding [a] *said* suitable hydrocarbon [to be converted to acetylene,] together with a small non-flammable amount of oxygen into the first regenerative zone at a point opposite from the combustion zone, passing said suitable hydrocarbon-oxygen mixture through the regenerative zone toward the combustion zone whereby the hydrocarbon-oxygen mixture is heated to a temperature whereby initial thermal alteration and subsequent partial combustion take place with the liberation of substantial heat, permitting said heat liberation and said partial combustion to take place in the combustion zone intermediate between the two regenerative zones whereby substantially the remainder of the suitable hydrocarbon is converted to [acetylene] *said unsaturated hydrocarbon,* then immediately conducting the [acetylene] *unsaturated hydrocarbon*-containing gas from the combustion zone through the second regenerative zone to the cooler end thereof, thereby cooling the [acetylene] *unsaturated hydrocarbon*-containing gas and increasing the temperature of the second regenerative zone, the period of residence of the suitable hydrocarbon in [the] *said* first regenerative zone being not substantially greater than 0.01 second and in the combustion zone not greater than 0.02 second, permitting the flow of said mixture to continue until the temperature of the end of the first regenerative zone aforesaid adjacent the combustion zone drops to between 900° C.–1000° C., and then discontinuing the flow of said suitable hydrocarbon and oxygen, thereafter introducing a fuel into said combustion zone and feeding to the second regenerative zone at the point opposite the combustion zone sufficient oxygen to give a flammable mixture with the fuel in said combustion zone and permit substantially complete combustion of the fuel, passing this oxygen-containing gas through the second regenerative zone toward the combustion zone whereby the oxygen is raised to at least combustion temperature and upon admixture with fuel gas in said combustion zone institutes combustion as aforesaid with the liberation of heat, conducting said combustion products through the first regenerative zone from the end adjacent to the combustion zone toward the cooler end of the first zone whereby the end of the first zone adjacent the combustion zone is again raised to a temperature between 900–1300° C. aforesaid, and then discontinuing the feed of the fuel to the combustion zone and oxygen to the second regenerative zone and instituting the feed of the suitable hydrocarbon-oxygen mixture as aforesaid to cause the production of [acetylene] *said unsaturated hydrocarbon.*

11. A process for producing an off-gas containing a substantial amount of [acetylene] *an unsaturated hydrocarbon* from an in-gas comprising a suitable hydrocarbon convertible to [acetylene] *said unsaturated hydrocarbon,* which comprises heating adjacent ends of two separate elongated unobstructed regenerative zones, so that the adjacent end of at least the first of the zones is raised to a temperature between 900–1300° C., feeding [the] *said* suitable hydrocarbon [to be converted to acetylene] together with a small non-flammable amount of oxygen together with diluent into the first regenerative zone at the end of the zone opposite from the hot end, passing said suitable hydrocarbon-oxygen-diluent mixture through the first regenerative zone toward the hotter end whereby the hydrocarbon-oxygen-diluent mixture is heated to a temperature whereby initially thermal alteration and subsequently partial combustion take place with the liberation of substantial heat, permitting said heat liberation and said partial combustion to take place in the combustion zone intermediate between the two regenerative zones whereby a substantial portion of [the] *said* suitable hydrocarbon is converted to [acetylene] *said unsaturated hydrocarbon,* then immediately conducting the [acetylene] *unsaturated hydrocarbon*-containing gas through the second regenerative zone in the direction from the hotter to the cooler end thereof, thereby cooling the [acetylene] *unsaturated hydrocarbon*-containing gas and increasing the temperature of the zone, permitting the aforesaid flow of gases to continue until the temperature of the end of the first regenerative zone adjacent the combustion zone drops substantially, and then discontinuing the flow of said suitable hydrocarbon-oxygen-diluent mixture, thereafter introducing fuel into the combustion zone and feeding to the second regenerative zone at the point opposite from the hotter end a sufficient amount of oxygen-containing gas to give a flammable mixture with fuel in said combustion zone and substantially complete combustion of said fuel, passing this oxygen-containing gas through the second regenerative zone toward the hotter end whereby the oxygen-containing gas is raised to at least the combustion temperature of the fuel and upon mixture with said fuel gas institutes combustion thereby liberating heat, conducting said hot combustion products through the first regenerative zone whereby the hot end of the first zone is again raised to a temperature between 900–1300° C. aforesaid, and then discontinuing the feed of the fuel and oxygen-containing-gas and instituting the feed of *said* suitable hydrocarbon-oxygen mixture as aforesaid to reinstitute production of [acetylene] *said unsaturated hydrocarbon.*

12. The process for producing an off-gas containing a substantial amount of [acetylene] *unsaturated hydrocarbon* from an in-gas containing a suitable hydrocarbon convertible to [acetylene] *said unsaturated hydrocarbon,* which comprises heating adjacent ends of two adjacent elongated unobstructed regenerative zones, so that the end adjacent to the combustion zone of at least the first zone is at a temperature above 900° C., feeding [the] *said* suitable hydrocarbon [to be converted to acetylene] together with a small non-flammable amount of oxygen into the first regenerative zone at the cooler end, passing said suitable hydrocarbon-oxygen mixture through the regenerative zone toward the hotter end so that the hydrocarbon-oxygen mixture is heated to a temperature whereby initially thermal alteration and subsequently partial combustion take place with the liberation of substantial heat, whereby a substantial portion of [the] *said suitable* hydrocarbon is converted to acetylene, then immediately conducting the acetylene-containing gas through the second regenerative zone from the hotter end to the cooler end of the zone, thereby cooling the [acetylene] *unsaturated hydrocarbon*-containing-gas and increasing the temperature of the zone, this step of the process being carried out under a pressure of between .2–.8 atmosphere absolute, permitting the flow of said mixture to continue until the temperature of the hotter end of the first regenerative zone drops 100–300° C., and then discontinuing the flow of such suitable hydrocarbon and oxygen mixture, thereafter introducing fuel gas into the combustion zone and feeding to the second regenerative zone at the cooler end thereof sufficient oxygen-containing-gas to give a flammable mixture with said fuel, passing this oxygen-containing gas through the second regenerative zone toward the hotter end thereof whereby the oxygen-containing gas is raised to at least combustion temperature of the fuel and substantially complete combustion takes place upon mixing thereof with fuel gas in the combustion zone, conducting the combustion products through the first regenerative zone whereby the adjacent end of the first zone is again raised to a temperature between 900–1300° C. and then discontinuing the feed of the fuel and oxygen-containing-gas and instituting the feed of suitable hydrocarbon-oxygen mixture as aforesaid to reinstitute the production of [acetylene] *unsaturated hydrocarbon.*

13. A process for producing an off-gas containing a substantial amount of acetylene from an in-gas comprising a hydrocarbon convertible to acetylene, which comprises heating adjacent ends of two separate elongated unobstructed regenerative zones, so that the adjacent end of at least the first regenerative zone is at a temperature between 900–1300° C., feeding the hydrocarbon to be converted to acetylene together with a small non-flammable amount of air into the first zone at the cooler end, passing said hydrocarbon-air mixture through the first regenerative zone toward the hotter end whereby the hydrocarbon-air mixture is heated to a temperature whereby initially thermal alteration and subsequently partial combustion take place with the liberation of substantial heat, permitting said heat liberation and said partial combustion to take place in the combustion zone intermediate between the two regenerative zones, whereby the hydrocarbon is converted to acetylene, then immediately conducting the acetylene-containing gas through the second regenerative zone from the hotter end to the cooler end of the zone, thereby cooling the acetylene-containing-gas and increasing the temperature of the zone, the period of residence of the suitable hydrocarbon in the first zone being not substantially greater than 0.01 second, permitting the aforesaid flow of gases to continue for between about 30 to 100 seconds, and then discontinuing the flow of hydrocarbon and air, thereafter introducing fuel gas into the combustion zone and feeding to the second regenerative zone sufficient oxygen-containing gas for substantially complete combustion with the fuel, passing the oxygen-containing-gas through the second regenerative zone toward the hotter end whereby the oxygen-containing-gas is raised to a temperature sufficient to cause combustion with said fuel for liberating heat and generating hot combustion products, conducting said hot combustion products through the first regenerative zone whereby the adjacent end of the first zone is again raised to a temperature between 900–1300° C. aforesaid, the intermixing of said fuel and said oxygen-containing gas being accomplished in a manner that the 900–1300° C. temperature is produced in the zone at the desired point, and then after a short period discontinuing the feed of the fuel and oxygen-containing-gas and instituting production of acetylene as aforesaid.

References Cited in the file of this patent or the original patent

UNITED STATES PATENTS

| | | |
|---|---|---|
| 1,721,735 | Isley | July 23, 1929 |
| 1,848,184 | Mawha | Mar. 8, 1932 |
| 1,965,770 | Burgin | July 10, 1934 |
| 2,208,123 | Duncan | July 16, 1940 |
| 2,261,319 | Wilcox | Nov. 4, 1941 |
| 2,275,232 | Rice | Mar. 3, 1942 |
| 2,377,245 | Krejci | May 29, 1945 |
| 2,394,849 | Doumani et. al. | Feb. 12, 1946 |
| 2,475,093 | Hasche | July 5, 1949 |
| 2,498,444 | Orr | Feb. 21, 1950 |
| 2,529,598 | Deanesly | Nov. 14, 1950 |
| 2,552,277 | Hasche | May 8, 1951 |

FOREIGN PATENTS

| | | |
|---|---|---|
| 578,311 | Germany | June 12, 1933 |
| 583,851 | Germany | Sept. 13, 1933 |
| 265,234 | Great Britain | Sept. 21, 1938 |